US011023216B2

(12) United States Patent
Fuse (10) Patent No.: US 11,023,216 B2
(45) Date of Patent: Jun. 1, 2021

(54) STORAGE MEDIUM, INFORMATION PROCESSING APPARATUS, AND CONTROL METHOD

(71) Applicant: CANON KABUSHIKI KAISHA, Tokyo (JP)

(72) Inventor: Hiroshi Fuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/027,105

(22) Filed: Jul. 3, 2018

(65) Prior Publication Data

US 2019/0073204 A1 Mar. 7, 2019

(30) Foreign Application Priority Data

Sep. 6, 2017 (JP) .............................. JP2017-171179

(51) Int. Cl.
*G06F 8/61* (2018.01)
*G06F 8/65* (2018.01)

(52) U.S. Cl.
CPC . *G06F 8/61* (2013.01); *G06F 8/65* (2013.01)

(58) Field of Classification Search
CPC ................. G06F 8/61; G06F 8/65; G06F 8/62
See application file for complete search history.

(56) References Cited

U.S. PATENT DOCUMENTS

| 6,735,766 B1* | 5/2004 | Chamberlain | G06F 8/65 |
| | | | 709/203 |
| 10,277,688 B2* | 4/2019 | Tyebkhan | H04L 67/16 |
| 2002/0095671 A1* | 7/2002 | Delo | G06F 8/61 |
| | | | 717/174 |
| 2004/0147253 A1* | 7/2004 | Fukuzato | G06F 8/61 |
| | | | 455/418 |
| 2007/0150886 A1* | 6/2007 | Shapiro | G06F 16/164 |
| | | | 717/174 |
| 2007/0234343 A1* | 10/2007 | Gouge | G06F 21/51 |
| | | | 717/174 |
| 2007/0245344 A1* | 10/2007 | Kumagai | G06F 8/65 |
| | | | 717/174 |
| 2008/0141241 A1* | 6/2008 | Mills | G06F 8/656 |
| | | | 717/174 |
| 2011/0283275 A1* | 11/2011 | Dan | G06F 8/61 |
| | | | 717/176 |
| 2012/0013926 A1* | 1/2012 | Sugai | G06F 13/10 |
| | | | 358/1.13 |
| 2012/0323857 A1* | 12/2012 | Brehm | G06F 8/61 |
| | | | 707/674 |
| 2013/0263106 A1* | 10/2013 | Fuse | G06F 8/61 |
| | | | 717/168 |
| 2014/0282488 A1* | 9/2014 | Tagliabue | G06F 11/07 |
| | | | 717/174 |
| 2016/0026534 A1* | 1/2016 | Ru | G06F 11/1448 |
| | | | 707/652 |
| 2019/0310837 A1* | 10/2019 | Zmijewski | G06F 9/451 |

FOREIGN PATENT DOCUMENTS

JP 2012-048410 A 3/2012

* cited by examiner

*Primary Examiner* — Wei Y Zhen
*Assistant Examiner* — Brahim Bourzik
(74) *Attorney, Agent, or Firm* — Canon U.S.A, Inc. IP Division (57) ABSTRACT

After first application software is installed, second application software is installed, and a shortcut for accepting a user operation on the application software is created.

9 Claims, 8 Drawing Sheets

```
INSTALLER INFORMATION FOR FIRST INSTALLER

InstallerVersion : 3.0.0              — 301
    UpgradeCode : {446B52ED-8A33-4ABA-BB9B-8357934FC1B1}
    ProductCode : {300FC74E-362B-4282-BFBA-A10BA1A5DAA2}
                                                          — 302
```

FIG. 3B

```
INSTALLER INFORMATION FOR SECOND INSTALLER

InstallerVersion : 3.0.1              — 311
    UpgradeCode : {446B52ED-8A33-4ABA-BB9B-8357934FC1B1}
    ProductCode : {300FC74E-362B-4282-BFBA-A10BA1A5DAA2}
                                                          — 312
```

FIG. 3C

```
REGISTRY INFORMATION

Installed Software

Base Application
      ProductVersion : 3.0.0              — 321
      UpgradeCode : {446B52ED-8A33-4ABA-BB9B-8357934FC1B1}
      ProductCode : {300FC74E-362B-4282-BFBA-A10BA1A5DAA2}
                                                          — 322
    Option Application
      ProductVersion : 3.0.0              — 323
      UpgradeCode : {8AA521AC-8A55-2CBF-7791-EE95634FC1B1}
      ProductCode : {489CA14B-2B36-8BF2-40B2-D1C187A5DAA2}
                                                          — 324
```

STORAGE MEDIUM, INFORMATION PROCESSING APPARATUS, AND CONTROL METHOD

BACKGROUND

Field of the Disclosure

The present disclosure relates to a storage medium, an information processing apparatus, and a control method for installing application software.

Description of the Related Art

In recent years, as application software has been growing in scale and has become more complicated, more and more products need to have a plurality of installers executed in a proper procedure to operate a piece of application software. However, it is not always easy for users with low information technology (IT) literacy to execute the installers in a proper procedure.

Japanese Patent Application Laid-Open No. 2012-48410 discusses performing by a server computer a conflict check (consistency check) about the order of installation in installing a plurality of pieces of software. According to Japanese Patent Application Laid-Open No. 2012-48410, the user can install desired application software without considering the order of execution of installers.

SUMMARY

According to an aspect of the present disclosure, a storage medium storing programs including a first program for installing first application software and a second program for installing second application software, wherein the first program includes a confirmation unit configured to confirm a presence of the second program for adding a function to the first application software, wherein the second program includes an activation unit configured to be activated in a case where the presence of the second program is confirmed, and wherein after the first application software is installed, the second program activated by the activation unit installs the second application software and creates a shortcut for accepting a user operation on the first application software and the second application software.

Further features of the present disclosure will become apparent from the following description of exemplary embodiments with reference to the attached drawings.

DESCRIPTION OF THE EMBODIMENTS

If a user activates application software under installation while a plurality of installers therefor are executed in succession, the installation processing may fail.

For example, if the user purchases application software including a service pack, the product may include a base installer and a service pack installer. Typically, the installers of such configuration often start the installation processing of the service pack automatically after the installation processing of the base application software is completed. In such a case, a shortcut is created on the desktop screen of an operating system (OS) when the installation processing of the base application software is completed. The user can then easily activate the application software using the shortcut during the installation of the service pack.

If the user activates the application software under installation, modules required for the execution of the application software are loaded and locked by the OS. This disables the updating of service pack modules by the service pack installer, and then the installation processing of the service pack fails.

The modules failed to be updated by the service pack installer can be updated after the application software is restarted. However, it is undesirable for the user to use, even temporarily, a "bug-unfixed product" or a "product with only base functions without a new function" despite the purchase of the application software including the service pack.

Some embodiments are directed to a technique for preventing execution of processing for activating already-installed application software before an installer for performing additional installation on the installed application software is activated.

According to an exemplary embodiment, the execution of the processing for activating already-installed application software can be prevented before an installer for performing additional installation on the installed application software is activated.

In an exemplary embodiment, a shortcut creation method for preventing the user from activating application software during execution of an installer is implemented.

An exemplary embodiment will be described below with reference to the drawings.

<Hardware Configuration>

Figure 1:
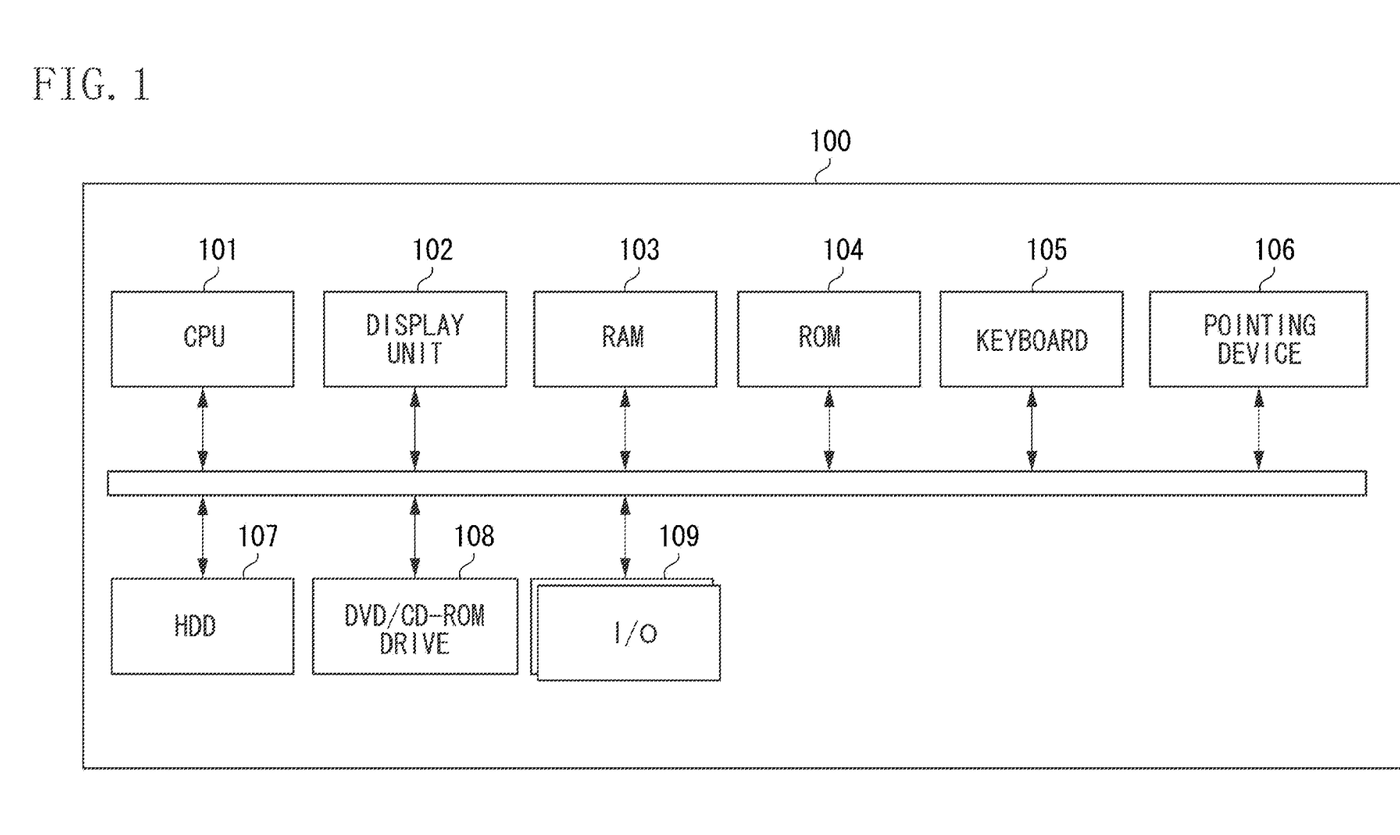
FIG. 1 is a block diagram illustrating a hardware configuration example.

FIG. 1 is a block diagram illustrating a hardware configuration example according to an exemplary embodiment. FIG. 1 illustrates a hardware configuration example of an information processing apparatus 100 (computer). The information processing apparatus 100 is provided with a keyboard 105 and a pointing device 106 serving as input devices for receiving user operation inputs.

The keyboard 105 is a device for inputting information such as characters and numerals into the information processing apparatus 100. For example, the keyboard 105 includes keys for inputting Japanese kana characters and alphabet characters, a numerical keypad for inputting numerals, various function keys, cursor keys, and other keys.

For example, the pointing device 106 includes a mouse. When the user operates the information processing apparatus 100 using a graphical user interface (GUI), the user can input predetermined information by clicking on a button or icon displayed on a display device with the mouse. For example, the information processing apparatus 100 displays an icon representing installed application software on a display unit 102, and a central processing unit (CPU) 101 activates the application software in response to the user's mouse click on the icon. The information processing apparatus 100 further includes the display unit 102 for providing visual output information feedback to the user.

The display unit 102 displays various types of information on a screen of, for example, a cathode ray tube (CRT)

display, a liquid crystal display, or a plasma display. The display unit 102 displays input results of the keyboard and the mouse, and screens (e.g., user interface) provided by the installers and application software.

The information processing apparatus 100 further includes the CPU 101, a random access memory (RAM) 103, a read-only memory (ROM) 104, and a hard disk drive (HDD) 107 used for controlling operation thereof. As a characteristic operation of the present exemplary embodiment, the CPU 101 controls operations of first and second installers 200 and 210 illustrated in FIG. 2, on the information processing apparatus 100. The CPU 101 executes the first and second installers 200 and 210 on the information processing apparatus 100, and performs various calculations, information processing, and control processing on the entire information processing apparatus 100 according to predetermined programs.

The RAM 103, the ROM 104, and the HDD 107 store various programs and execution information in the present exemplary embodiment. The information processing apparatus 100 further includes a digital versatile disk (DVD)/compact disk read-only memory (CD-ROM) drive 108 for reading data recorded on a DVD or CD. The CPU 101 loads and executes an OS and other control programs into and on the RAM 103. The other control programs include control programs for implementing the present exemplary embodiment. The RAM 103 also functions as various work areas and a temporary save area for use in executing the control programs. In the present exemplary embodiment, the RAM 103 includes a reserved area used by the CPU 101 to activate the first and second installers 200 and 210 and to perform internal processing of the system. The ROM 104 is a storage device that stores various control programs, data, and parameters for performing various controls by the CPU 101.

The HDD 107 includes a readable/writable storage medium and a drive unit for reading and writing programs and data from and to the storage medium. In the present exemplary embodiment, the HDD 107 is a local disk including a hard disk. The storage medium included in the HDD 107 may be a magneto-optical disk, a magnetic disk, or a semiconductor memory. The HDD 107 stores the first and second installers 200 and 210 illustrated in FIG. 2. The HDD 107 stores a communication program for controlling an interface device input/output (I/O) 109 and maintaining communication via a network. The HDD 107 also stores the OS, which is basic application software, for operating clients for performing memory management and file I/O management.

The information processing apparatus 100 further includes the interface device I/O 109 for performing communication with external devices, and the CPU 101 for executing programs. The connection configuration of communication with peripheral devices may be wired or wireless. The interface device I/O 109 connects to another terminal (such as a web server and a mail server) via a network such as a local area network (LAN) and the Internet. For example, in performing communication via the Internet, the interface device I/O 109 uses a protocol such as the Transmission Control Protocol/Internet Protocol (TCP/IP).

The processing described in the present exemplary embodiment is implemented by loading the programs, execution information, and temporary data stored in the ROM 104 or the HDD 107 into the RAM 103 and executing the programs by the CPU 101.

<Software Configuration>

Figure 2:
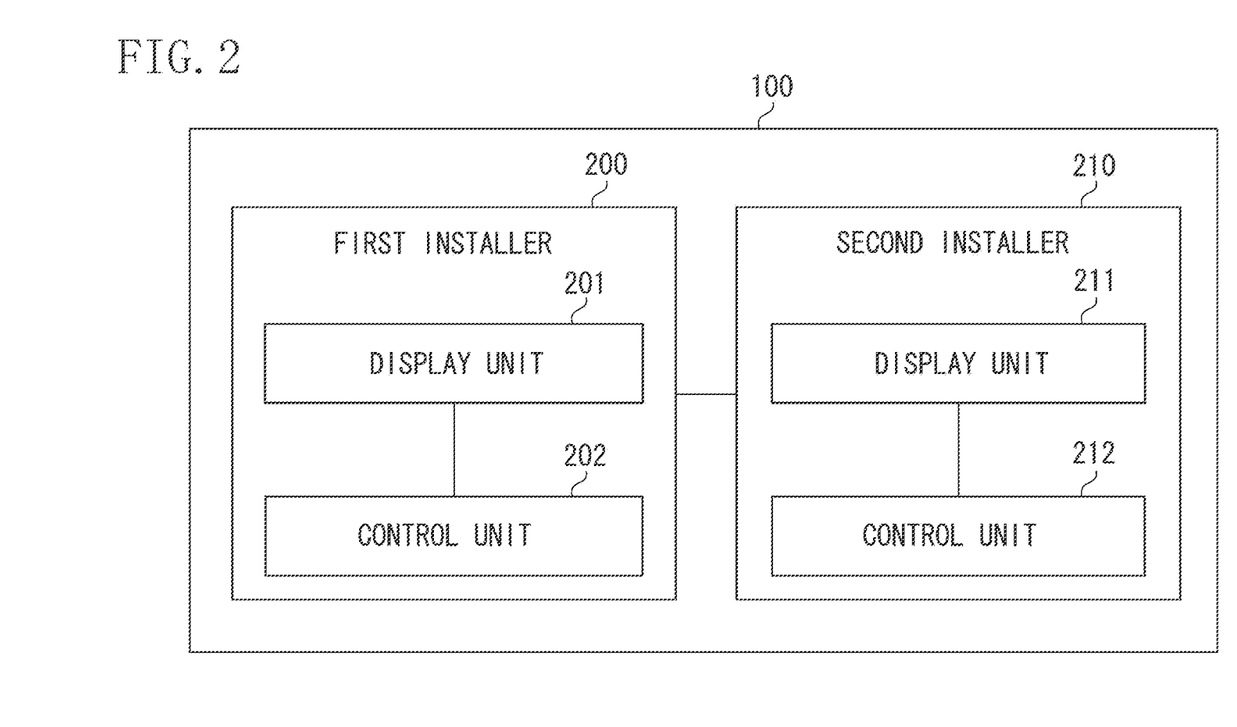
FIG. 2 is a block diagram illustrating a software configuration example.

FIG. 2 is a block diagram illustrating a software configuration example.

The information processing apparatus 100 includes a plurality of installers (first installer 200 and second installer 210). In the present exemplary embodiment, the second installer 210 has a similar configuration to that of the first installer 200, and redundant information will be omitted.

The first and second installers 200 and 210 are typically stored in a DVD or CD by the creator of the application software, or converted into archive files and uploaded to a web page. There are two patterns of installer distribution methods. One is a single installer format in which individual installers are separately distributed. The other is a multi-installer format in which a plurality of installers is distributed together. For example, in a case where a service pack of application software is released, and two installers including a base installer and a service pack installer are distributed together, the multi-installer format is employed. In a case where the base application software is already installed on the user's personal computer (PC) and the service pack released thereafter is additionally installed, the service pack installer is distributed in the single installer format. The first and second installers 200 and 210 illustrated in FIG. 2 can be said to be an installer set distributed in the multi-installer format.

The components of the information processing apparatus 100 will be described.

The first installer 200 includes various user interfaces for performing installation of application software. The first installer 200 accepts a request from the user on the desktop of the information processing apparatus 100, and manages the execution of function processes in a comprehensive manner.

The first installer 200 includes a display unit 201 and a control unit 202. The components constituting each installer will be described.

The display unit 201 constructs a user interface of the first installer 200. Further, the display unit 201 processes the acceptance of various input operations from the user via a GUI.

The control unit 202 includes functions for the entire processing by the installer control. For example, the control unit 202 performs installation, uninstallation, and repair installation of application software (not illustrated), and sets and constructs applications based on the acceptance of various input operations from the user. The control unit 202 analyzes setting information about the first and second installers 200 and 210 of the information processing apparatus 100. For example, the setting information refers to installer information 300 and registry information 320 that is managed by the first and second installers 200 and 210. Details of the setting formation will be described below with reference to FIGS. 3A, 3B, and 3C.

When installing application software, the control unit 202 further performs processing for enabling acceptance of a user input for activating already-installed application software. As an example of the processing, the control unit 202 creates a shortcut for accepting a user input for activating the application software on the desktop screen provided by the OS of the information processing apparatus 100. In another example of the processing, the control unit 202 may display the application software on a list on a menu screen or associate the application software with a file extension.

Figure 5A:
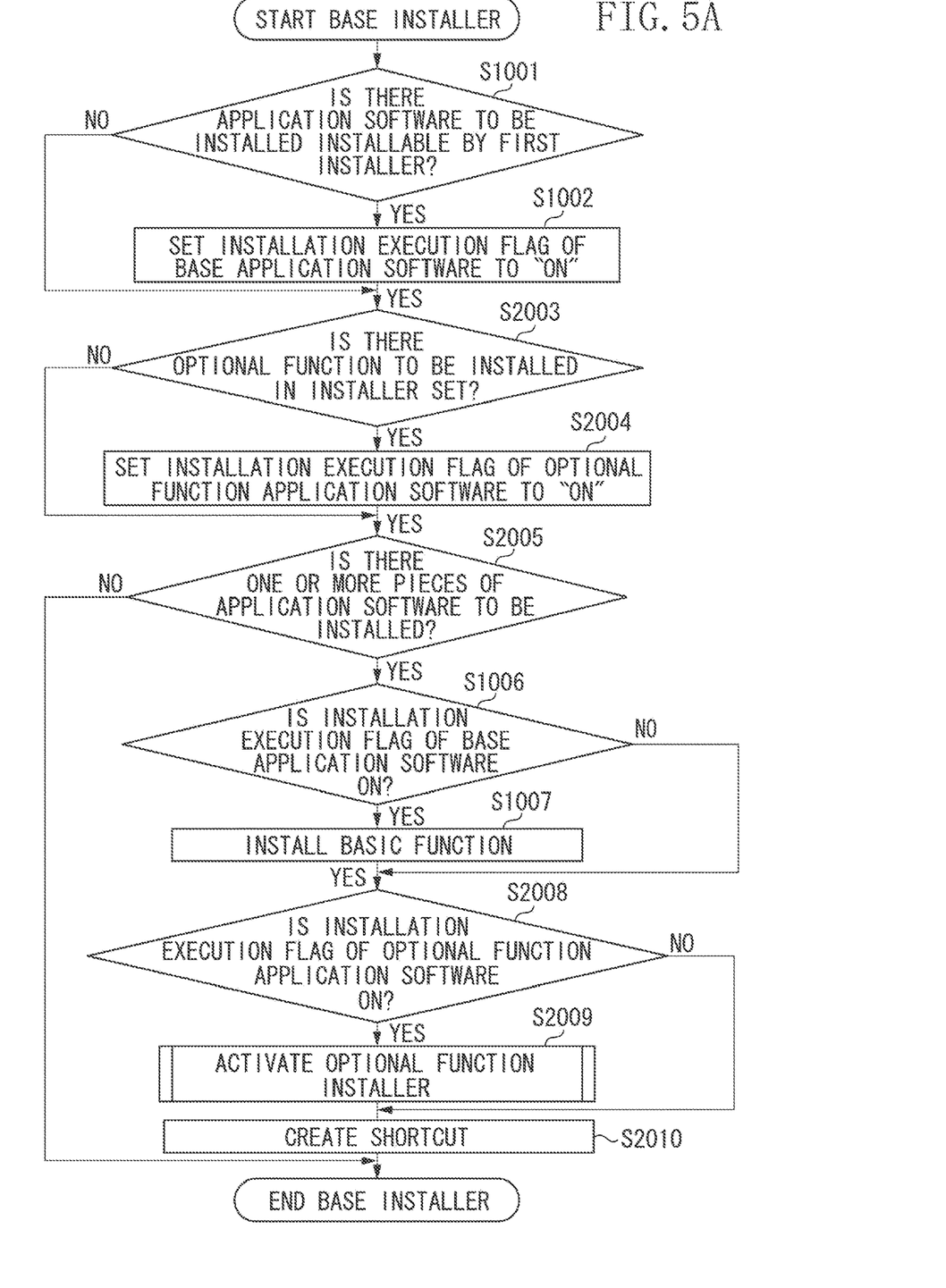
FIGS. 5A and 5B are flowcharts illustrating processing according to a second exemplary embodiment.
Figure 5B:
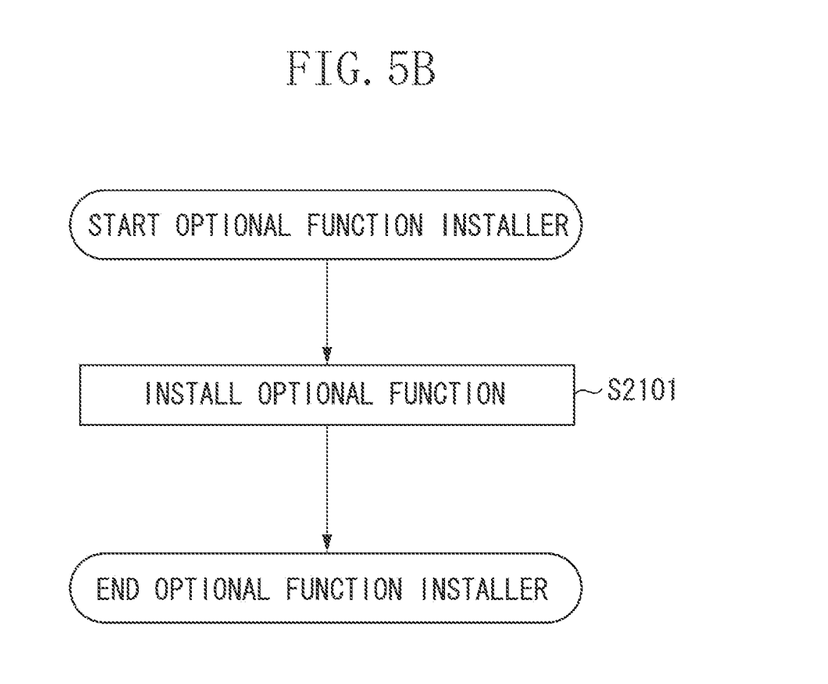

The first installer 200 is an installer for installing basic functions of application software on the information processing apparatus 100. The second installer 210, including a display unit 211 and a control unit 212, is an installer for a service pack intended for additional installation of the application software. The additional installation by the service pack installer includes, for example, a bug fix and security enhancement to the basic functions of the base installer, and addition of an upgraded function to the functions of the base application software. On the other hand, a second installer 210 according to a second exemplary embodiment, described below in FIGS. 5A and 5B, is an installer for installing an optional function by additional installation of the application software. The installer of the optional function installs an additional function that is not included in the functions of the base application software and can be added with user customization. Like the control unit 202 of the base installer, the control unit 212 of the service pack installer can perform processing for enabling the acceptance of a user input for activating the already-installed application software. For example, the control unit 212 has a function of creating a shortcut. On the other hand, the control unit 212 of the installer of the optional function does not have the function of performing processing for enabling the acceptance of a user input for activating the already-installed application software, and therefore cannot create a shortcut.

The processing described in the present exemplary embodiment is implemented by the CPU 101 loading programs stored in the ROM 104 or the HDD 107 into the RAM 103 and executing the programs.

<Setting Information about Installers>

Figure 3A:
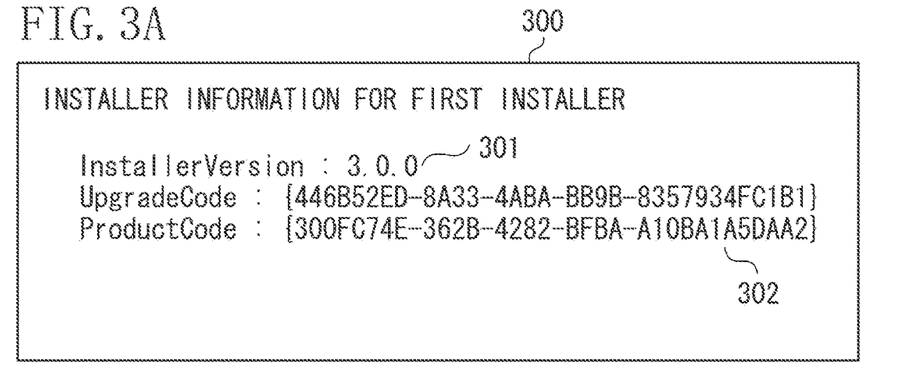
FIGS. 3A, 3B, and 3C are diagrams illustrating examples of setting information about installers.
Figure 3B:
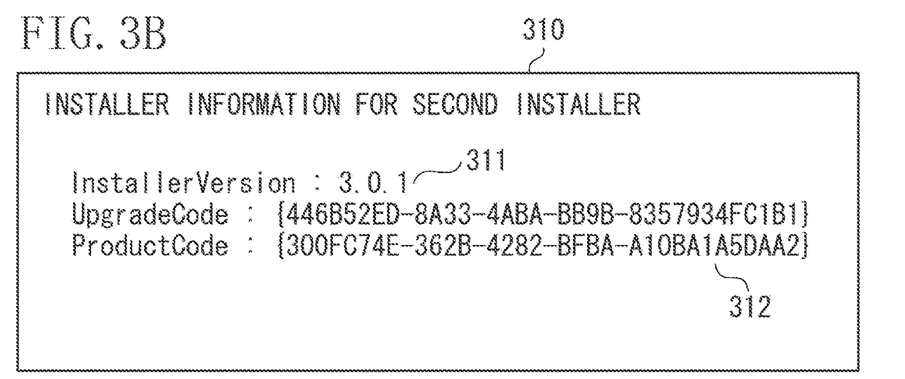
Figure 3C:
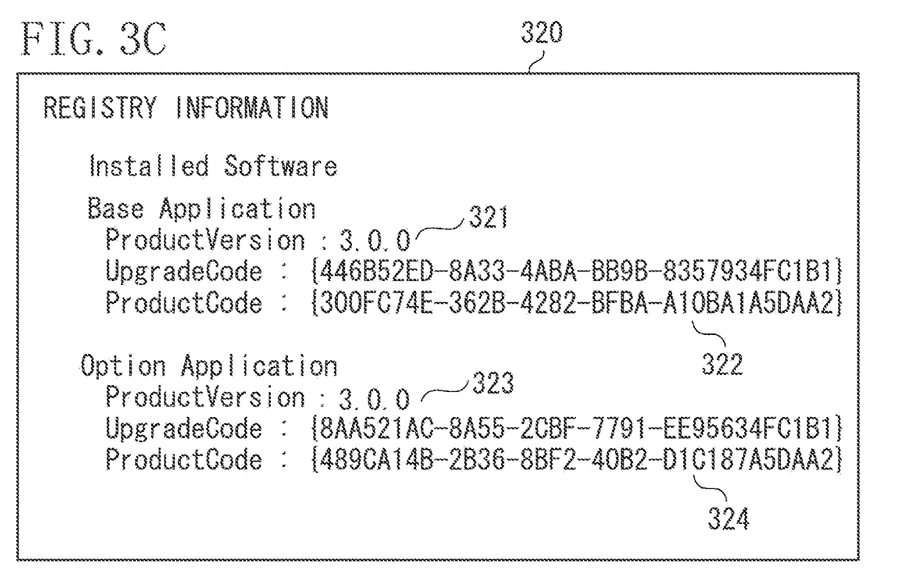

FIGS. 3A, 3B, and 3C illustrate examples of the setting information about the first and second installers 200 and 210.

The setting information about the first and second installers 200 and 210 includes installer information retained by the first and second installers 200 and 210 and registry information retained by the OS. Such types of information are used in combination in the installation processing of the first and second installers 200 and 210.

First, installer information 300 illustrated in FIG. 3A will be described. The installer information 300 is setting information required for the installation processing by the first installer 200. The installation information 300 is information retained by the first installer 200. For example, the setting information includes InstallerVersion 301, ProductCode 302, and UpgradeCode. Similarly, installer information 310 illustrated in FIG. 3B is setting information required for the installation processing by the second installer 210. The installer information 310 is information retained by the second installer 210. In the present exemplary embodiment, the installer information 310 has a similar configuration to that of the installer information 300. Thus, a description of redundant information will be omitted.

The items of the installer information 300 will be described. InstallerVersion 301 indicates the version of the application software installable by the first installer 200. The version of application software typically includes three values respectively indicating a major version, a minor version, and a revision (version of a service pack). For example, if the major version, the minor version, and the revision respectively have a value of "3", a value of "0", and a value of "0", the version of the application software is "3.0.0". In the present exemplary embodiment, InstallerVersion 301 has a value of "3.0.0", and application software of version 3.0.0 is installed by the first installer 200. InstallerVersion 311 of the installer information 310 has a value of "3.0.1", and application software of version 3.0.1 is installed by the second installer 210.

ProductCode 302 is a unique number or character string used to identify the application software. This value is written into ProductCode 322 of the registry information 320 by the first installer 200. When a service pack applicable to already-released application software is released, ProductCode 302 and UpgradeCode are typically not changed. In other words, if the service pack is installed, the value of ProductCode 322 and the value of UpgradeCode written in the registry information 320 remain unchanged. If the second installer 210 is an installer of an optional function, ProductCode and UpgradeCode have different values from those retained by the first installer 200 (not illustrated). If the values are different, the application software installed by the first installer 200 and that installed by the second installer 210 have no upgrade dependency therebetween. ProductVersion 323 and ProductCode 324 will be described in the second exemplary embodiment.

In summary, in the examples of FIGS. 3A, 3B, and 3C, the first installer 200 having the installer information 300 can be considered to be a base, and the second installer 210 having the installer information 310 can be considered to be a service pack to the base.

Next, the registry information 320 illustrated in FIG. 3C will be described. The registry information 320 illustrates an example of a list of registry information retained by the OS of the information processing apparatus 100.

The registry information 320 is information about the application software installed on the information processing apparatus 100, and is stored in the ROM 104. For example, the registry information 320 includes ProductVersion 321, ProductCode 322, UpgradeCode, and an installation path of the application software. The registry information 320 manages a plurality of pieces of application software. In the example of FIG. 3C, the registry information 320 includes information about two pieces of application software, including base application software and optional function application software for the base application software. More specifically, ProductVersion 321 and ProductCode 322 are information about the registry information of the base application software. ProductVersion 323 and ProductCode 324 are information about the registry information of the optional function application software for the base application software. A description of redundant information about the two ProductVersions and two ProductCodes included in the registry information 320 will be omitted.

The items of the registry information 320 will be described. ProductVersion 321 indicates the version of the base application software installed on the information processing apparatus 100. For example, if ProductVersion 321 has a value of "3.0.0", the application software of version 3.0.0 is installed.

If a service pack is installed, the revision has a value of "1" or more. In the example illustrated in FIG. 3C, the value of the revision is "0" and it can be determined that no service pack is installed.

ProductCode 322 is a unique number or character string used to identify the application software. The presence of ProductCode 322 of application software in the registry information 320 indicates that the application software is installed.

The information retained in the installer information and the registry information is not limited to that in the present exemplary embodiment.

<Processing by Installers According to First Exemplary Embodiment>

In the first exemplary embodiment, a case where the first installer 200 and the second installer 210 are executed in succession will be described. In the first exemplary embodiment, the first and second installers 200 and 210 will be respectively treated as a base installer and a service pack installer.

First, the case where the first installer 200 and the second installer 210 are executed in succession will be described. If the base and service pack, i.e., the first and second installers 200 and 210, are executed in succession, the installation processing of the service pack may sometimes fail. Specifically, if the first and second installers 200 and 210 are executed in succession, the first installer 200 for the base initially creates a shortcut on the desktop screen of the OS. Then, the second installer 210 for the service pack is executed. When the execution of the first installer 200 for the base is completed, the user can issue an instruction to activate the application software from the shortcut created on the desktop screen of the OS. If the application software is activated here during the execution of the second installer 210 for the service pack, the second installer 210 for the service pack may be unable to update a module of the application software and the installation processing may fail.

Now, a technique for dynamically changing the timing of shortcut creation according to the installer configuration will be described.

<Processing by Installers According to First Exemplary Embodiment>

Figure 4A:
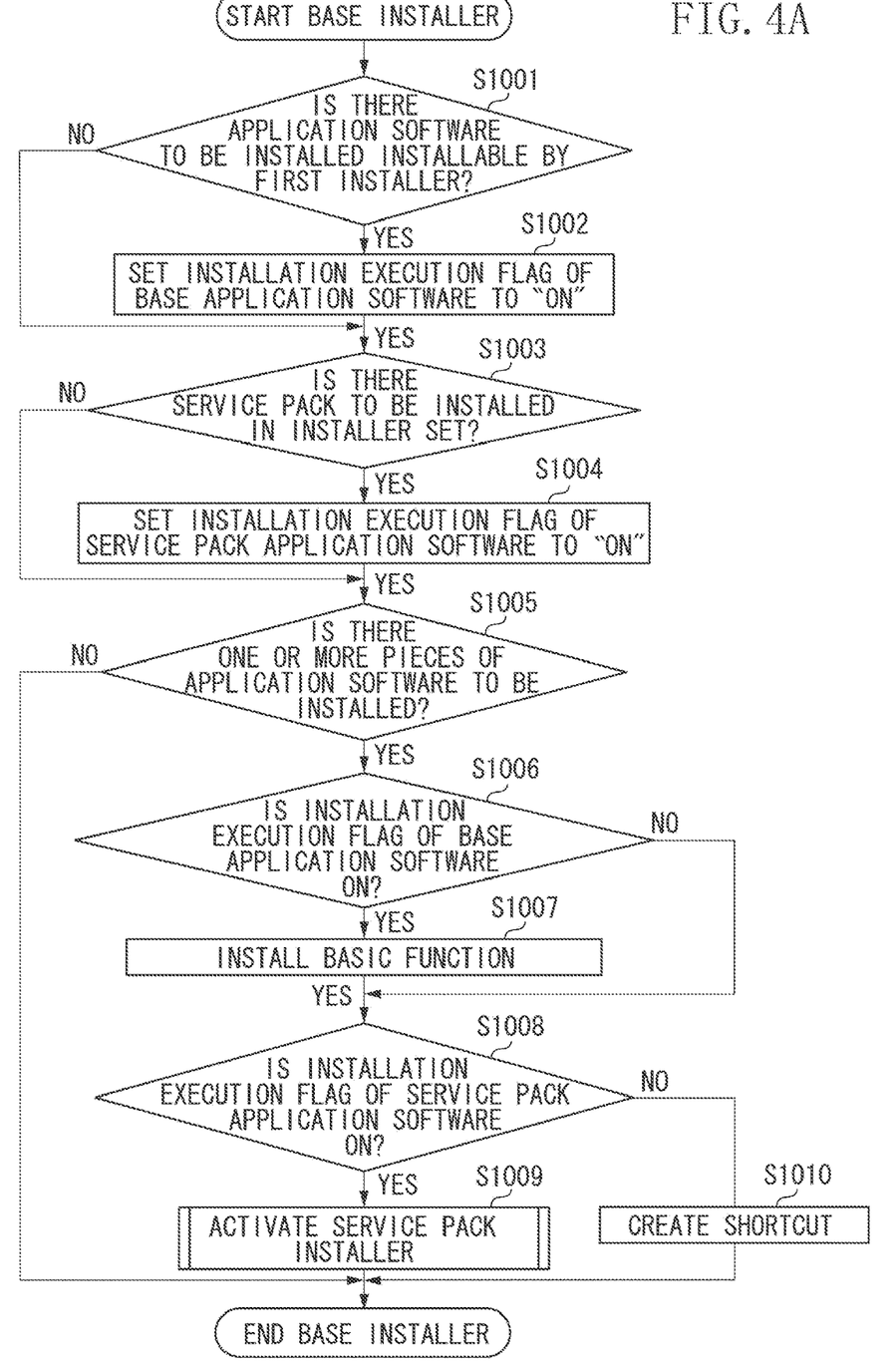
FIGS. 4A and 4B are flowcharts illustrating processing according to a first exemplary embodiment.
Figure 4B:
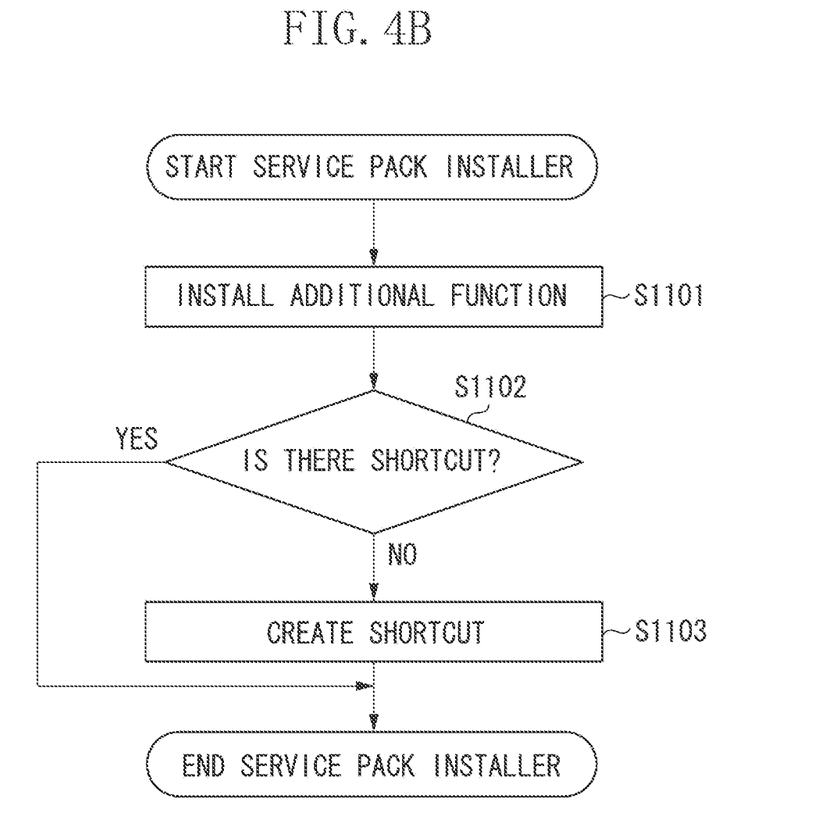

FIGS. 4A and 4B are flowcharts illustrating processing of the first installer 200 for the base and the second installer 210 for the service pack. A flow of processing will be described using the first and second installers 200 and 210 running on the information processing apparatus 100 in FIG. 1 as an example. The flowcharts illustrated in FIGS. 4A and 4B illustrate a technique for preforming dynamic shortcut creation processing by the first and second installers 200 and 210. The processing of steps S1001 to S1010 is performed by the first installer 200. The processing of steps S1101 to S1103 is performed by the second installer 210.

FIG. 4A is a flowchart illustrating a flow of processing by the first installer 200, which is the base installer.

If the first installer 200 is activated, then in step S1001, the control unit 202 determines whether there is application software to be installed that is installable by the first installer 200. If there is application software to be installed (YES in step S1001), the processing proceeds to step S1002. If not (NO in step S1001), the processing proceeds to step S1003.

The determination logic of step S1001 will be specifically described. The control unit 202 obtains the registry information 320. Based on the registry information 320 and the installer information 300, the control unit 202 then analyzes whether ProductCode 302 retained by the installer information 300 is included in the registry information 320. If ProductCode 302 is included in ProductCode 322 of the registry information 320, the control unit 202 determines that the base application software is installed (NO in step S1001), and the processing proceeds to step S1003. On the other hand, if ProductCode 302 is not included in the ProductCode 322 of the registry information 320 or if there is no registry information 320, the control unit 202 determines that the base application software is not installed yet (YES in step S1001), and the processing proceeds to step S1002.

In step S1002, the control unit 202 sets an installation execution flag of the base application software to on.

In step S1003, the control unit 202 determines whether there is a service pack to be installed in an installer set of multi-installer format. If there is a service pack to be installed (YES in step S1003), the processing proceeds to step S1004. If not (NO in step S1003), the processing proceeds to step S1005.

The determination logic of step S1003 will be specifically described. First, the control unit 202 obtains installer information 310 about a service pack. If the control unit 202 fails to obtain the installer information 310, the control unit 202 determines that there is no second installer 210 for the service pack (NO in step S1003), and the processing proceeds to step S1005. Next, the CPU 202 obtains the registry information 320. Based on the installer information 310 about the service pack and the registry information 320, the control unit 202 then analyzes whether ProductCode 312 retained by the installer information 310 is included in the registry information 320. If ProductCode 302 is not included in ProductCode 322 of the registry information 320 or if there is no registry information 320, the control unit 202 determines that there is a service pack to be installed (YES in step S1003), and the processing proceeds to step S1004. On the other hand, if ProductCode 302 is included in ProductCode 322 of the registry information 320, the control unit 202 further compares InstallerVersion 311 with ProductVersion 321. At that time, for example, the control unit 202 compares the values of the respective revisions. If, as a result of the comparison, InstallerVersion 311 is greater, the control unit 202 determines that there is a service pack to be installed (YES in step S1003), and the processing proceeds to step S1004. On the other hand, if InstallerVersion 311 is smaller than or equal to ProductVersion 321, the control unit 202 determines that there is no service pack yet to be installed (NO in step S1003), and the processing proceeds to step S1005.

In step S1004, the control unit 202 sets an installation execution flag of the service pack application software to ON.

In step S1005, the control unit 202 determines whether there is one or more pieces of application software to be installed. The determination logic of step S1005 uses the "installation execution flag of the base application software" and the "installation execution flag of the service pack application software". If at least either one of the installation execution flags is on, the control unit 202 determines to install application software of some kind. If there is one or more pieces of application software to be installed (YES in step S1005), the processing proceeds to step S1006. If not (NO in step S1005), the processing of the present flowchart ends.

In step S1006, the control unit 202 determines whether the installation execution flag of the base application software is on. If the installation execution flag is on (YES in step S1006), the processing proceeds to step S1007. If the installation execution flag is off (NO in step S1006), the processing proceeds to step S1008.

In step S1007, the control unit 202 installs the basic function of the application software. The installation processing performed in step S1007 includes copying the files of the application software and registering the application software in the registry. After the completion of the installation executed in step S1007, the control unit 202 does not create a shortcut. The shortcut is created after the completion of the installation of an additional function by the second installer 210 for the service pack to be described below.

In step S1008, the control unit 202 determines whether the installation execution flag of the service pack application software is on. If the installation execution flag is on (YES in step S1008), the processing proceeds to step S1009. If the installation execution flag is off (NO in step S1008), the processing proceeds to step S1010.

In step S1009, the control unit 202 activates the second installer 210 for installing the service pack, and performs the processing by the second installer 210 illustrated in FIG. 4B. In other words, in step S1009, the control unit 202, when installing the application software, activates the second installer 210 without performing processing for enabling the acceptance of a user input for activating the installed application software.

In step S1010, the control unit 202 creates a shortcut to the application software on the desktop screen of the OS. Then, the processing of the first installer 200 ends.

FIG. 4B is a flowchart illustrating a flow of processing by the second installer 210, which is the service pack installer.

If the second installer 210 is activated by the first installer 200 in step S1009, then in step S1101, the control unit 212 installs the additional function of the application software. The installation processing performed in step S1101 is processing for copying the files of the application software and registering the application software in the registry, and does not include the processing for creating a shortcut.

In step S1102, the control unit 212 determines whether there is a shortcut to the application software on the desktop screen of the OS. If there is a shortcut (YES in step S1102), the processing of the second installer 210 ends. If not (NO in step S1102), the processing proceeds to step S1103.

In step S1103, the control unit 212 creates a shortcut to the application software on the desktop screen of the OS. Then, the processing of the second installer 210 ends.

After the completion of the installation processing of the service pack in step S1101, the first installer 200 for the base may create the shortcut instead of the second installer 210 for the service pack.

If the base application software alone has been installed in advance, the shortcut to the application software has already been created on the desktop screen of the OS. However, the user may have deleted the shortcut from the desktop screen of the OS. Then, in the processing of steps S1102 and S1103 performed by the second installer 210 for the service pack, the control unit 212 may determine whether the shortcut created by the first installer 200 for the base needs to be repaired, and repair the shortcut if needed.

A technique for dynamically changing the timing of shortcut creation according to the installer configuration has been described above. If the first installer 200 for the base and the second installer 210 for a service pack are executed in succession, the second installer 210 for the service pack can thus create a shortcut without the first installer 200 for the base creating the shortcut. As a result, the timing of shortcut creation occurs uniformly at the end of the installation processing regardless of the installer configuration, and the user is prevented from activating the application software from the shortcut during installation. This can suppress activation operations of the application software during installation.

<Processing by Installers According to Second Exemplary Embodiment>

In a second exemplary embodiment, a technique for a case where a first installer 200 and a second installer 210 are executed in succession will be described. In the second exemplary embodiment, the first installer 200 and the second installer 210 will be respectively treated as a base installer and an optional function installer.

First, the case where a first installer 200 and a second installer 210 are executed in succession will be described. The second installer 210 for the optional function is an installer that can install an optional function on the base application software. Typically, the second installer 210 for the optional function only installs the optional function with respect to the base application software, and does not perform processing for creating a shortcut to the base application software. Therefore, if the first installer 200 for the base and the second installer 210 for the optional function are executed in succession, the user may activate the application software before the optional function is enabled.

In the second exemplary embodiment, a technique for dynamically changing the timing of shortcut creation according to the installer configuration will be described.

<Processing by Installers According to Second Exemplary Embodiment>

FIGS. 5A and 5B are flowcharts illustrating processing of the first installer 200 for the base and the second installer 210 for the optional function. A flow of processing will be described using the first and second installers 200 and 210 running on the information processing apparatus 100 in FIG. 1 as an example. The flowcharts illustrate a technique for performing dynamic shortcut creation processing by the first and second installers 200 and 210. The processing of steps S2001 to S2010 is performed by the first installer 200. The processing of step S2101 is performed by the second installer 210. A description of steps overlapping with those of the flowcharts illustrated in FIGS. 4A and 4B will be omitted.

FIG. 5A is a flowchart illustrating a flow of processing by the first installer 200, which is the base installer.

In step S2003, the control unit 202 determines whether there is an optional function to be installed in an installer set of multi-installer format. If there is an optional function to be installed (YES in step S2003), the processing proceeds to step S2004. If not (NO in step S2003), the processing proceeds to step S2005.

The determination logic of step S2003 will be specifically described. First, the control unit 202 obtains installer information 310 about an optional function. If the control unit 202 fails to obtain the installer information 310, the control unit 202 determines that there is no second installer 210 for the optional function (NO in step S2003), and the processing proceeds to step S2005. Next, the control unit 202 obtains the registry information 320. Based on the installer information 310 about the optional function and the registry information 320, the control unit 202 analyzes whether ProductCode 312 retained by the installer information 310 is included in the registry information 320.

If ProductCode 302 is not included in ProductCode 324 of the registry information 320 or if there is no registry information 320, the control unit 202 determines that there is an optional function to be installed (YES in step S2003), and the processing proceeds to step S2004. On the other hand, if ProductCode 302 is included in ProductCode 324 of the registry information 320, the control unit 202 compares InstallerVersion 311 of the installer information 310 with ProductVersion 323 of the registry information 320. For example, the control unit 202 compares the values of the respective revisions. If, as a result of the comparison, InstallerVersion 311 is greater, the control unit 202 determines that there is an optional function to be installed (YES in step S2003), and the processing proceeds to step S2004. On the other hand, if InstallerVersion 311 is smaller than or equal to ProductVersion 323, the control unit 202 determines that there is no optional function yet to be installed (NO in step S2003), and the processing proceeds to step S2005.

In step S2004, the control unit 202 sets an installation execution flag of the optional function application software to on.

In step S2005, the control unit 202 determines whether there is one or more pieces of application software to be installed. For the determination of step S2005, the control unit 202 uses the "installation execution flag of the base application software" and the "installation execution flag of the optional function application software". If either of the installation execution flags is on, the control unit 202 determines to install application software of some kind. If there is one or more pieces of application software to be installed (YES in step S2005), the processing proceeds to step S1006. If not (NO in step S2005), the processing of the first installer 200 ends.

In step S2008, the control unit 202 determines whether the installation execution flag of the optional function application software is on. If the installation execution flag is on (YES in step S2008), the processing proceeds to step S2009. If the installation execution flag is off (NO in step S2008), the processing proceeds to step S2010.

In step S2009, the control unit 202 activates the second installer 210 for installing the optional function application software, and performs the processing by the second installer 210 (FIG. 5B).

In step S2010, the control unit 202 creates a shortcut to the application software on the desktop screen of the OS. Then, the processing of the first installer 200 ends.

FIG. 5B is a flowchart illustrating a flow of processing by the second installer 210, which is the optional function installer.

If the second installer 210 is activated by the first installer 200 in step S2009, then in step S2101, the control unit 212 installs the optional function applicable to the base application software. Then, the processing by the second installer 210 ends. The installation processing performed in step S2101 is processing for copying the files of the application software and registering the application software in the registry, and does not include the processing for creating a shortcut. After the completion of the installation processing of the optional function in step S2101, then in step S2010, the first installer 200 creates a shortcut.

A technique for dynamically changing the timing of shortcut creation according to the installer configuration has been described above. If the first installer 200 for the base and the second installer 210 for the optional function are executed in succession, the first installer 200 for the base can thus create the shortcut after the termination of the second installer 210 for the optional function. Therefore, the timing of shortcut creation occurs uniformly at the end of the installation processing regardless of the installer configuration, and the user is prevented from activating the application software from the shortcut during installation. This can suppress the activation operation of the application software during installation.

<Processing by Installer According to Third Exemplary Embodiment>

In a third exemplary embodiment, a technique for a case where a second installer 210 is executed alone will be described. In the third exemplary embodiment, the second installer 210 is treated as a service pack installer.

The case where a second installer 210 is executed alone will be described. If the base application software is installed in advance, there already is a shortcut created on the desktop screen of the OS. If the installation of a service pack alone is performed in such a state, the user can easily activate the application software from the shortcut on the desktop screen of the OS during the execution of the service pack installer. Like the first and second exemplary embodiments, if the second installer 210 for the service pack is executed alone, the user may thus activate the application software before the completion of the installation of the service pack.

In the third exemplary embodiment, a technique for creating a shortcut according to the presence or absence of the shortcut will be described.

<Processing of Installers According to Third Exemplary Embodiment>

Figure 6:
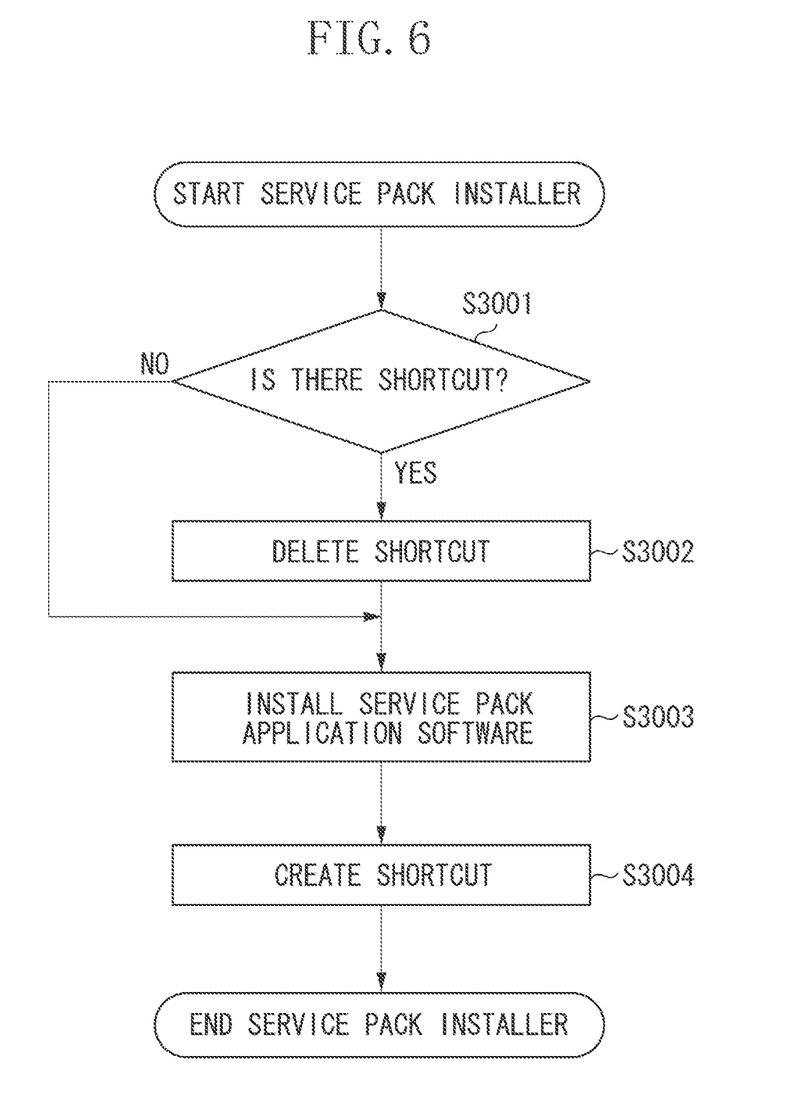
FIG. 6 is a flowchart illustrating processing according to a third exemplary embodiment.

FIG. 6 is a flowchart illustrating a flow of processing by the second installer 210 for the service pack. The flow of processing will be described using the second installer 210 running on the information processing apparatus 100 illustrated in FIG. 1 as an example. The flowchart illustrates a technique for performing processing for creating a shortcut by the second installer 210 according to the presence or absence of the shortcut.

If the activation processing of the second installer 210 is started, then in step S3001, the control unit 212 determines whether there is a shortcut to the application software on the desktop screen of the OS. If there is a shortcut (YES in step S3001), the processing proceeds to step S3002. If not (NO in step S3001), the processing proceeds to step S3003.

In step S3002, the control unit 212 deletes the shortcut to the application software from the desktop screen of the OS.

In step S3003, the control unit 212 installs the service pack application software applicable to the base application software. The installation processing performed in step S3003 is processing for copying the files of the application software and registering the application software in the registry, and does not include the processing for creating a shortcut.

In step S3004, the control unit 212 creates a shortcut to the application software on the desktop screen of the OS. Then, the processing of the second installer 210 ends.

Instead of deleting the shortcut in step S3002, the display of the shortcut may be temporarily changed to indicate that the application software is unable to be activated.

The second installer 210 according to the third exemplary embodiment is not limited to a service pack installer. The software configuration according to the third exemplary embodiment may be such that the information processing apparatus 100 includes only the second installer 210 without including the first installer 200 (not illustrated).

A technique for creating a shortcut according to the presence or absence of the shortcut has been described above. If the second installer 210 for the service pack is executed alone, the shortcut is thereby deleted during the installation of the service pack and is created at the end of the installation processing. This prevents the user from activating the application software from the shortcut during the installation of the service pack. As a result, an activation operation of the application software during installation can be suppressed.

Other Embodiments

Exemplary embodiments may include an apparatus or system constituted by combining the foregoing exemplary embodiments as appropriate, and a method thereof.

Some embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims the benefit of Japanese Patent Application No. 2017-171179, filed Sep. 6, 2017, which is hereby incorporated by reference herein in its entirety.

What is claimed is:

1. A non-transitory computer-readable medium storing instructions that, when executed by one or more processors, control the one or more processors to operate as:
    a first installing unit for performing first installing processing to install a base program which is a program for installing a basic function of an application software in an information processing apparatus;
    wherein, in a case where yet-to-be-performed second installing processing to update the base program installed in the information processing apparatus is present, the yet-to-be-performed second installing processing meaning second installing processing that has not yet been performed, based on an instruction from the first installing unit, the first installing unit does not generate a shortcut for using a function of the application software even if the first installing processing is completed to prevent a user from activating the application software from the shortcut during installation, a second installing unit for performing the second installing processing performs the second installing processing, and the second installing unit generates the shortcut after the second installing processing is performed, and
    wherein, in a case where the yet-to-be-performed second installing processing is not present, the first installing unit generates the shortcut after the first installing processing is completed.

2. An information processing apparatus comprising:
    at least one processor; and
    at least a memory in communication with the at least one processor, and having stored thereon instructions that are executable by the at least one processor, and cooperating with the at least one processor to act as a first installer for performing first installing processing to install a base program which is a program for installing a basic function of an application software in the information processing apparatus,
    wherein, in a case where yet-to-be-performed second installing processing to update the base program installed in the information processing apparatus is present, the yet-to-be-performed second installing processing meaning second installing processing that has not yet been performed, based on an instruction from the first installer, the first installer does not generate a shortcut for using a function of the application software even if the first installing processing is completed to prevent a user from activating the application software from the shortcut during installation, a second installer for performing the second installing processing performs the second installing processing, and the second installer generates the shortcut after the second installing processing is performed, and
    wherein, in a case where the yet-to-be-performed second installing processing is not present, the first installer generates the shortcut after the first installing processing is completed.

3. A control method of an information processing apparatus including a first installer for installing first application software and a second installer for installing second application software, the method comprising:
    controlling at least one processor in communication with at least one memory to cause the first installer to perform first installing processing to install a base program which is a program for installing a basic function of an application software in the information processing apparatus;
    in a case where yet-to-be-performed second installing processing to update the base program installed in the information processing apparatus is present, the yet-to-be-performed second installing processing meaning second installing processing that has not yet been performed, based on an instruction from the first installer, controlling the at least one processor in communication with the at least one memory to cause the first installer to not generate a shortcut for using a function of the application software even if the first installing processing is completed to prevent a user from activating the application software from the shortcut during installation, to cause the second installer to perform the second installing processing, and to cause the second installer to generate the shortcut after the second installing processing is performed, and
    in a case where the yet-to-be-performed second installing processing is not present, controlling the at least one processor in communication with the at least one memory to cause the first installer to generate the shortcut after the first installing processing is completed.

4. The information processing apparatus according to claim 2, further comprising:
    a setting unit configured to set a first flag for performing the first installing processing and a second flag for performing the second installing processing,
    wherein a shortcut for using a basic function of the application software is generated without performing the second installing processing in a case where the second flag is not set.

5. The non-transitory computer-readable medium according to claim 1, wherein the first installing processing is performed in response to a user's instruction, and the second installing processing is performed upon completion of the first installing processing.

6. The information processing apparatus according to claim 2,
wherein the first installing processing is performed in response to a user's instruction, and the second installing processing is performed upon completion of the first installing processing.

7. The control method according to claim 3,
wherein the first installing processing is performed in response to a user's instruction, and the second installing processing is performed upon completion of the first installing processing.

8. The non-transitory computer-readable medium according to claim 1,
wherein the first installing unit issues the instruction to the second installing unit upon completion of the first installing processing.

9. The non-transitory computer-readable medium according to claim 1, further comprising instructions that, when executed by the one or more processors, control the one or more processors to operate as:
the second installing unit for performing the second installing processing to update the base program installed in the information processing apparatus;
a determination unit configured to determine whether a shortcut for launching the application software, after completion of the second installing processing performed by the second installing unit, is present or not; and
a generation unit configured to generate the shortcut;
wherein the shortcut is generated in a case where the determination unit determines that the shortcut is not present, and
wherein the shortcut is not generated in a case where the determination unit determines that the shortcut is present.

* * * * *